United States Patent [19]

Stemmle

[11] Patent Number: 5,187,588
[45] Date of Patent: Feb. 16, 1993

[54] SCANNER WITH FLOATING BACKSTOP

[75] Inventor: Denis J. Stemmle, Webster, N.Y.

[73] Assignee: Xerox Corporation, Stamford, Conn.

[21] Appl. No.: 703,090

[22] Filed: May 20, 1991

[51] Int. Cl.$^5$ .................... H04N 1/028; H04N 1/10
[52] U.S. Cl. .................... 358/296; 358/472; 358/497; 358/498
[58] Field of Search ............ 358/296, 472, 497, 498

[56] References Cited

U.S. PATENT DOCUMENTS

| | | | |
|---|---|---|---|
| 4,053,225 | 10/1977 | Morohashi | 355/115 |
| 4,319,283 | 3/1982 | Ozawa et al. | 358/296 |
| 4,424,524 | 1/1984 | Daniele | 346/160 |
| 4,496,984 | 1/1985 | Stoffel | 358/293 |
| 4,574,317 | 4/1986 | Scheible | 358/285 |
| 4,583,126 | 4/1986 | Stoffel | 358/294 |
| 4,743,974 | 5/1988 | Lockwood | 358/296 |
| 4,823,195 | 4/1989 | Ito | 358/285 |
| 4,920,421 | 4/1990 | Stemmle | 358/296 |

Primary Examiner—George H. Miller, Jr.
Assistant Examiner—Scott A. Rogers

[57] ABSTRACT

A scanner having a frame assembly for supporting a movable document reading head for scanning movement in a scanning path in a first direction has a document transport to transport a document through the scanner and a drive to move the reading head across the document to read at least a portion of the document, the reading head having an optical imaging assembly including a frame supporting an imaging platen, the scanner including a floating document backstop opposite the imaging platen and extending across the scanning path to precisely position a document on the platen during an imaging operation. In a preferred embodiment the scanner includes a printing head with a comounted printing head.

17 Claims, 10 Drawing Sheets

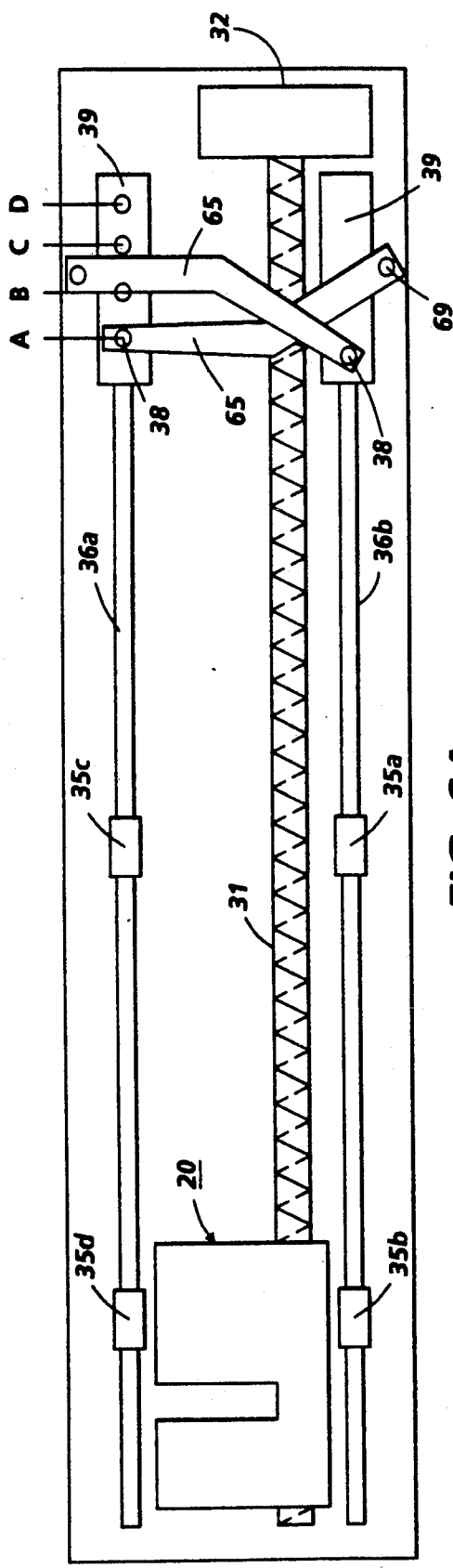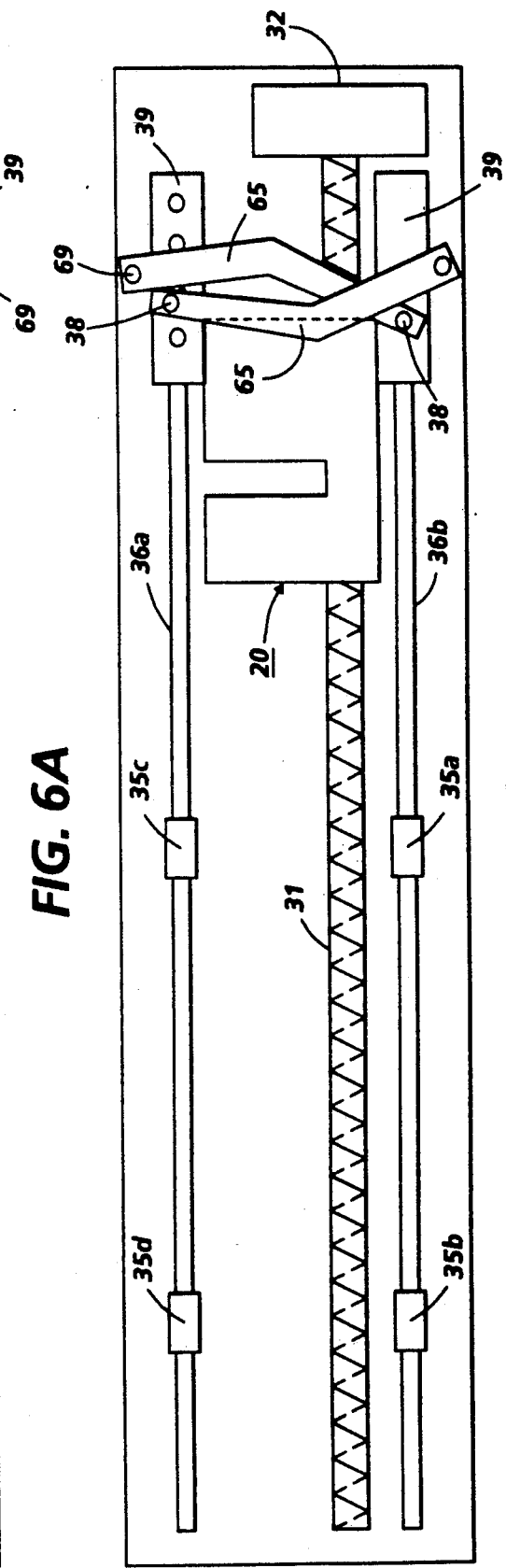

SCANNER WITH FLOATING BACKSTOP

CROSS REFERENCE TO RELATED APPLICATIONS

Attention is directed to copending U.S. application Ser. No. 07/451,056, filed Jul. 2, 1990, entitled Compact Multimode Input and Output Scanner; U.S. Pat. No. 5,162,916 entitled Compact Read/Write Scanner; U.S. Pat. No. 5,032,922 entitled Platen Accessory For Portable Copier and U.S. Pat. No. 5,077,614 entitled Scanner With Document and Copy Sheet Registration Means. Attention is also directed to copending U.S. application Ser. No. 07/703,083 entitled Indexing Mechanism for Compact Scanner; U.S. Ser. No. 07/702,989 entitled Scanning Carriage Drive and Image Timing; U.S. Pat. No. 5,153,736 entitled Toggling Sheet Transport And Registration System and U.S. Pat. No. 5,153,738 entitled Single Actuator Scanner, all filed concurrently herewith and commonly assigned.

BACKGROUND OF THE INVENTION

The present invention relates to a very low cost portable compact scanner employing a single scanning carriage incorporating a reading head and optionally a printing head to permit the reading of an original document or when the scanning carriage has both a reading head and a printing head it can provide essentially simultaneous reading and writing of an original document and a copy. More particularly, it is directed to a floating document backstop to precisely locate a document on the imaging platen during an imaging operation.

Historically, copies of original documents have been produced by a xerographic process wherein the original document to be copied is placed on a transparent platen, either by hand or automatically through the use of a document handler, and the original document illuminated by a relatively high intensity light. Image rays reflected from the illuminated document are focused by a suitable optical system onto a previously charged photoconductor, the image light rays functioning to discharge the photoconductor in accordance with the image content of the original to produce an electrostatic latent image of the original on the photoconductor. The electrostatic latent image so produced is thereafter developed by a suitable developer material commonly referred to as toner, and the developed image transferred to a sheet of copy paper brought forward by a suitable feeder. The transferred image is thereafter fixed to the copy paper by fusing to provide a permanent copy while the photoconductor is cleaned of residual developer preparatory to recharging. More recently, interest has arisen in electronic imaging where, in contrast to the aforedescribed xerographic system, the image of the document original is converted to electrical signals or pixels and these signals, which may be processed, transmitted over long distances, and/or stored, are used to produce one or more copies. In such an electronic imaging system, rather than focusing the light image onto a photoreceptor for purposes of discharging a charged surface prior to xerographic development, the optical system focuses the image rays reflected from the document original onto the image reading array which serves to convert the image rays to electrical signals. These signals are used to create an image by some means such as operating a laser beam to discharge a xerographic photoreceptor, or by operating some direct making system such as an ink jet or thermal transfer printing system.

It is generally advantageous if the normally separate document reading and copy printing operations could be combined. If some of these reading/writing functions could be combined, system operation and synchronization could be simplified and system cost reduced through the use of fewer parts.

In the above cross-referenced previously filed applications, an input output scanner concept is described wherein a single pair of paper path rolls drive both the document at the 12 o'clock position and the copy paper at the 6 o'clock position and the circumference of each roll is equal to the width of the reading head and the writing head. The scanning carriage has secured thereto a reading head and a printing head which carriage system scans across a document scanning a band of information across the document and prints a band of information across a copy sheet. The carriage system has a separate indexing mechanism to index the document and copy sheet to a second position to scan another band of information across the document. Between imaging scans both the paper and the document are advanced exactly the same amount by one complete revolution of the drive rolls thus eliminating the need for tight control of the run out tolerances on the rolls thereby insuring lower costs for the parts.

Most copiers, printers, facsimile machines and scanner devices use multiple electromechanical actuators such as motors, clutches, solenoids, etc. to operate the various components of the machine at various times in the processing cycle. Even in the compact combined input/output scanner described in the above cross-referenced previously filed applications, there were two motors required. One was used to move the scanning carriage and the second was used to advance both the document and the copy paper. For each electromechanical actuator, there are costs which must be born besides the unit cost of the actuator itself. These include a power supply to drive the device, harness costs to carry the power and control signals to the device, assembly costs to install the device, the power supply and the harness and electronic circuitry to control the devices and often some kind of voltage control circuitry to ensure proper operation of the devices over a wide range of operating voltages.

In addition, in the above-referenced previously filed application the circumference of the index drive roll is equal to 384 pixels at 16 per millimeter which means its diameter is about 7.7 millimeters which means that the optical system must fit within the 7.7 millimeters height constraint. The present invention is directed to meeting this architectural constraint with the minimum number of parts at the lowest cost.

PRIOR ART

U.S. Pat. No. 4,920,421 to Stemmle discloses an architecture including combing an input and output scanner and a fixed platen with a carriage system for scanning across the document and reading a band of information and printing it on a copy sheet, then indexing the carriage to the next band of information on the document while advancing the copy paper the same distance relative to the copy sheet support on the carriage.

In addition, there are several hand held scanners which are battery operated and produce only a copy of a relatively small or partial band of information, rather than a full copy of an 8½×11 sheet. For example, the Casio TM copy pen is an example of such a handheld battery powered scanner which uses manual operation to scan an 8 millimeter portion of a document which is stored and printed on plain paper by manually moving the printhead on the other end across the paper. Other similar devices read a document and simultaneously write a copy on thermal paper as it is unrolled from a paper supply on board the hand held copier. None of these devices have document or paper transport.

SUMMARY OF THE INVENTION

The present invention is directed to an input scanning system of ultra simplicity, very low cost and a high degree of portability.

In accordance with the principle aspect of the present invention a scanner having a movable document reading head for scanning movement in a scanning path in a first direction across a frame assembly has means to transport a document through the scanner and a reading head comprising an optical imaging assembly including a frame supporting an imaging platen, the scanner including a floating document backstop opposite the imaging platen and extending across the scanning path to precisely position a document on said platen during imaging operations.

In a further aspect of the present invention the imaging assembly includes an image illuminator, a lens and an input sensor having an array of photosites.

In a further aspect of the present invention the floating document backstop is rigid with a reflective white surface.

In the further aspect of the present invention the scanner has top cover for the frame assembly and movably supports the floating document backstop.

In a further aspect of the present invention the scanner includes a movable printing head and means to transport a copy sheet through the scanner in a copy sheet transport path and means to move said printing head across said copy sheet to print at least a portion of said document corresponding to that portion read by said reading head.

In a further aspect of the present invention the scanning carriage includes solid state devices with reading and printing elements respectively, securely comounted to a mounting substrate.

In a further aspect of the present invention the reading head produces a digital image and is electrically connected to the printing head for printing a digital image on a copy sheet.

In a further aspect of the present invention the means to transport a document and copy sheet include means to index a document through a document path in a direction transverse to the scanning direction and to index a copy sheet through a copy sheet path in the opposite transverse direction of indexing said document.

In a further aspect of the present invention the reading and printing occur essentially simultaneously without image storage.

In a further aspect of the present invention the right side pixel of the read head coincides with the lead edge of a portion of a document to be copied and the left side pixel of the printhead coincides with the lead edge of the print of said portion on a copy sheet to form a right reading image on the copy sheet.

In a further aspect of the present invention the scanning carriage is movably mounted between the plane of the document transport path and the plane of the copy sheet transport path.

In a further aspect of the present invention the indexing means simultaneously indexes a document in the document transport path and a copy sheet in the copy sheet transport path.

BRIEF DESCRIPTION OF THE DRAWINGS

For a better understanding of the present invention, reference is had to the accompanying drawings wherein the reference numerals have been applied to the same parts in several figures.

FIGS. 6A, 6B and 6C illustrate the cam operation of the single actuator copier concept.

DESCRIPTION OF PREFERRED EMBODIMENT

Figure 1A:
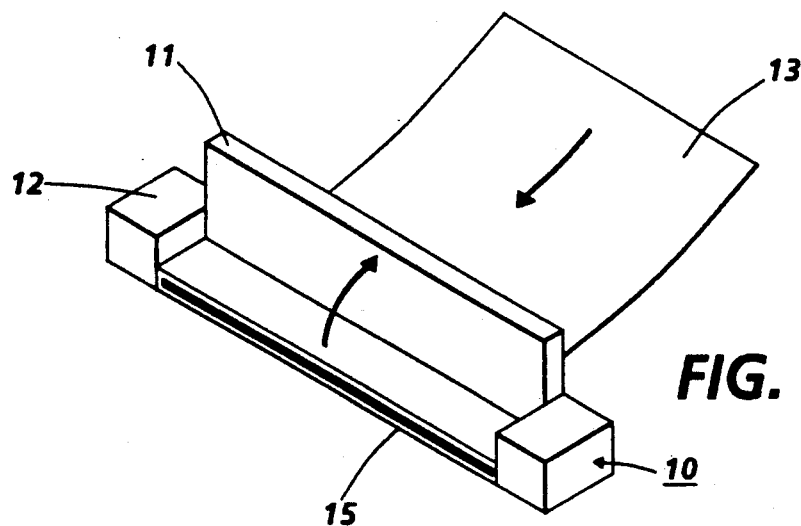
FIGS. 1A, 1B, and 1C are three isometric views illustrating the general operation of the compact copier.
Figure 1B:
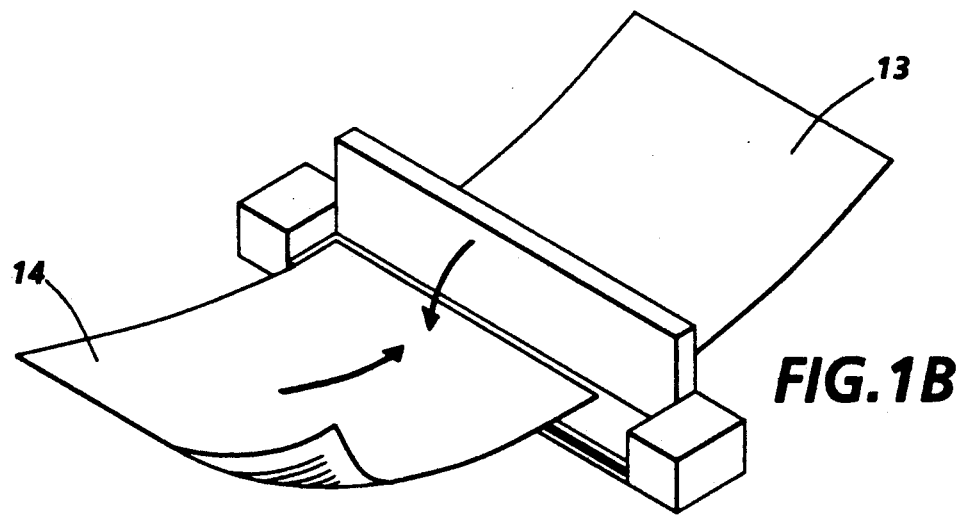
Figure 1C:
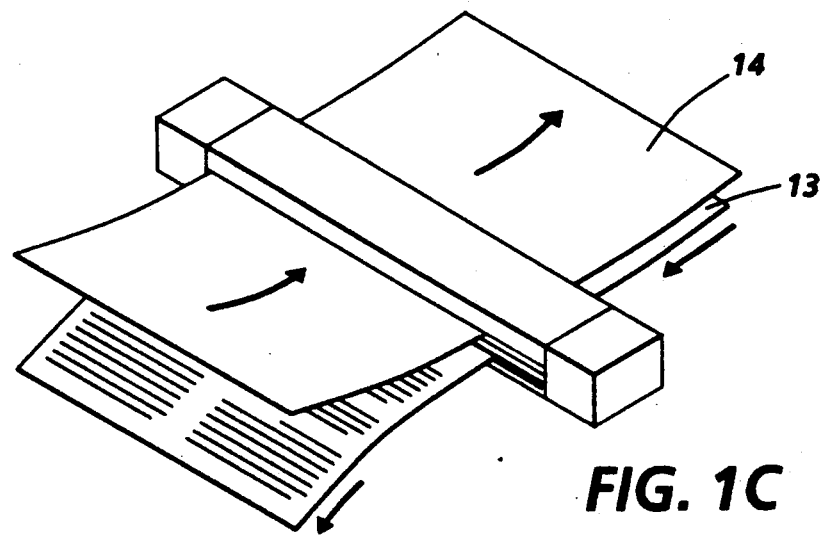

Referring now to FIGS. 1A, 1B and 1C a general overview of the compact scanner according to the present invention is provided. The scanner is generally illustrated as comprising a frame assembly 15 which may have maintenance station 12 at one end and a top cover 11 pivotally mounted to the frame assembly. To make a copy of document 14 the top cover is rotated to the open position as shown in FIG. 1A, copy sheet 13 is inserted at the entrance of the copy sheet transport path and the document 14 is inserted against a registration stop member in the top cover after which the top cover is closed and the copying sequence begins by the scanning carriage scanning a band of information across the document. During the scanning operation the document and copy paper are both held in a fixed position and the document and copy paper are both held in a fixed position and the image on the document is digitized by an input digitizing system and in the preferred embodiment a digital image is essentially simultaneously printed by a printing system on the copy sheet. Subsequently, the document is indexed to the right and the copy sheet is indexed to the left to enable the scanning carriage to scan a second band of information across the document. The distance of the indexing of both the document and copy sheet is the width of the band of information across the document.

Referring to FIGS. 2, 3, 4, 6A, 6B and 6C of the drawings there is shown a combined input scanner and output scanner designated generally by reference numeral 10. The scanner 10 includes a frame assembly 15 composed of a base unit 18, rails 19 within which scanning carriage 20 is transported during its scanning path. When not in scanning operation the scanning carriage 20 is parked at the home position. If the printing head is an ink jet head it is parked in the maintenance station 12 (see FIG. 1A) which may perform one or more of the following functions; sealing off the head to keep it from drying out or being contaminated, clean the head, humidify the head and act as a waste sump to enable the head to be primed.

Figure 4:
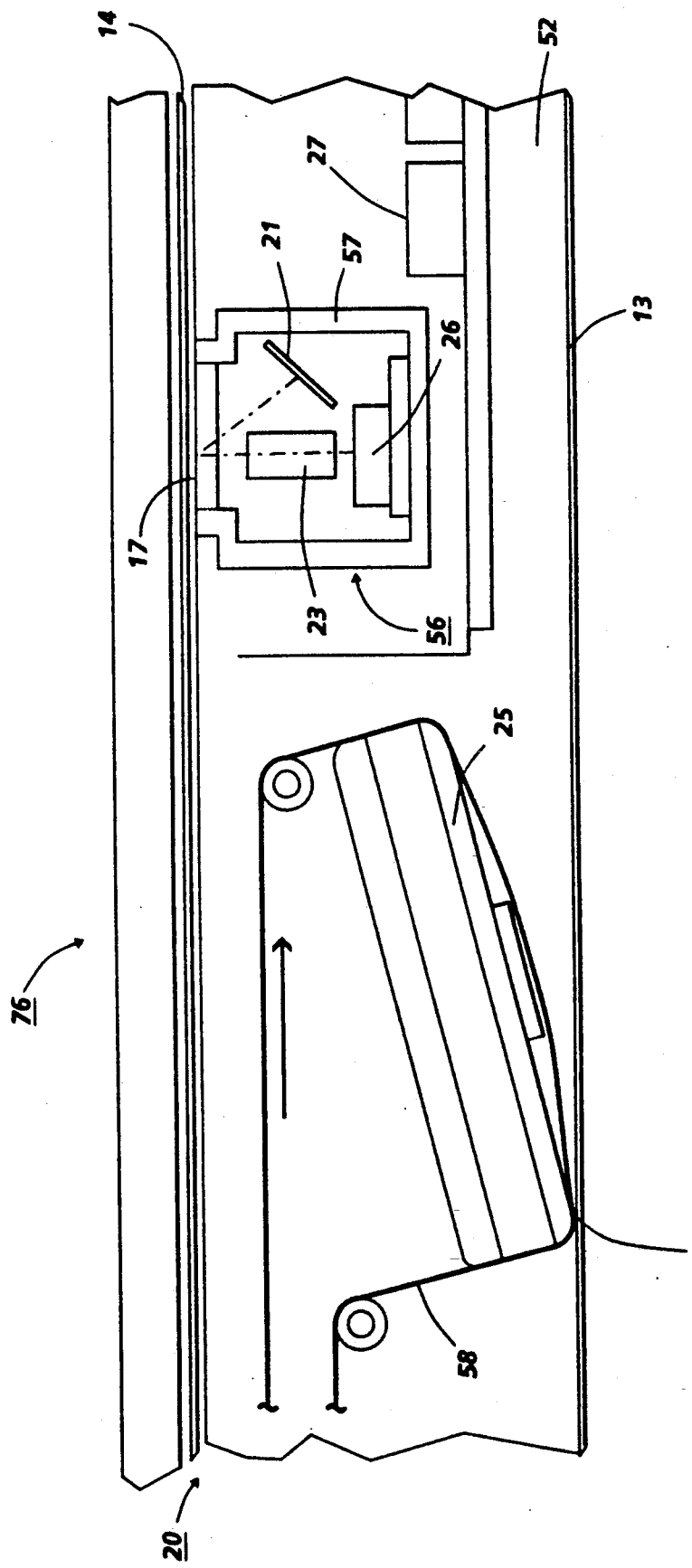
FIG. 4 is an enlarged sectional view illustrating the elements of the scanning carriage in the present invention

The scanning carriage 20 includes a reading head 17 and a printing head 25 mounted on substrate 52. The reading head comprises a contact image sensor, CIS 56, including an array of light emitting diodes 21 mounted to frame 57 for illuminating a document 14 adjacent a glass platen 54, an image of which is reflected through a lens 23 such as a Selfoc lens, to an input sensor chip 26 having an array of photosites for activation by the reflected radiation which is converted to electrical signals or pixels which are processed by an application specific integrated circuit (ASIC) 27 and subsequently transmitted to the printing head 25. The printing head may be an ink jet chip or a thermal print head (TPH) 25 printing on sensitized paper or by heating ink impregnated in a ribbon 58 as illustrated in FIG. 4 or some other direct marking device. Typically, the thermal print head comprises an array of heater elements, resistors 53, which are actuated, heated, to form pixels by direct contact with thermal paper 13 or by melting a small portion of ink on ribbon 58 and pressing it into plain paper 13, essentially simultaneously in response to the image read by the reading head. During the operation the scanning carriage scans a document which is in an image plane and prints on the copy sheet which is in the printing plane.

It will be understood that while reference has been made to reading heads and printing heads that the present invention encompasses in a generic sense solid state devices with input reading elements and solid state devices with output printing elements. It will also be understood that the number of scanning elements or sensors that comprise the image reading head 17 determine the initial scanning resolution while the number of heating elements 53 that comprise the printing head 25 determine the resolution of the image copy. In a preferred embodiment the number of input scanning elements equals the number of output printing elements. In a particularly preferred embodiment the sensor chip has 384 photosites at 400 per inch or 16 per millimeter and the thermal print head also has 384 heater elements at 400 per inch or 16 per millimeter. Both the reading head and the printing head are secured for movement on scanning carriage 20 which may be mounted for unidirectional scanning movement or forward and backward bi-directional scanning movement in a scanning path along the length of the frame assembly by means of scan stepper motor 32 through lead screw 31 to move the scanning carriage on the rails 19.

Figure 5:
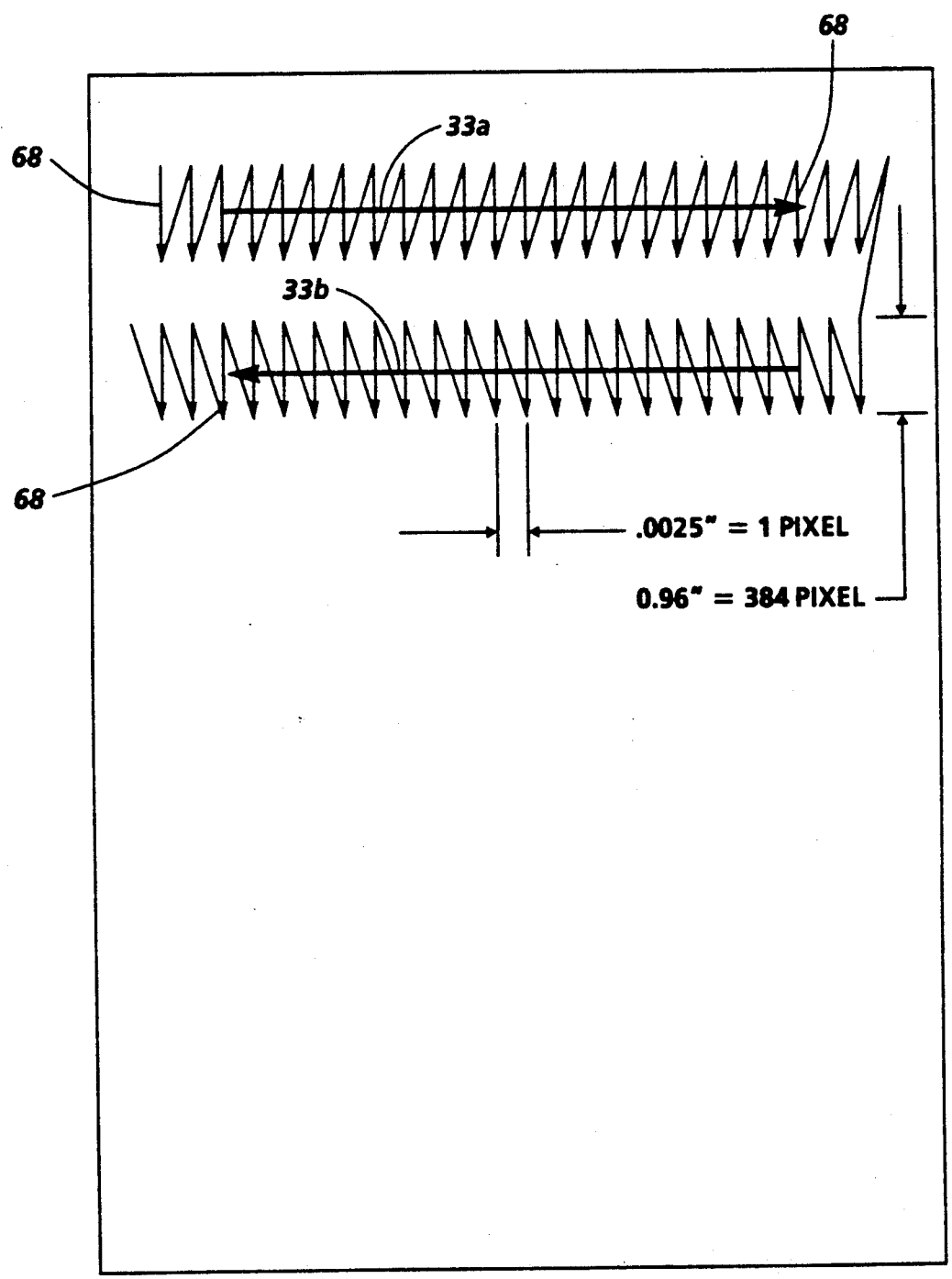
FIG. 5 is an illustration of the scanning operation.
Figure 6C:
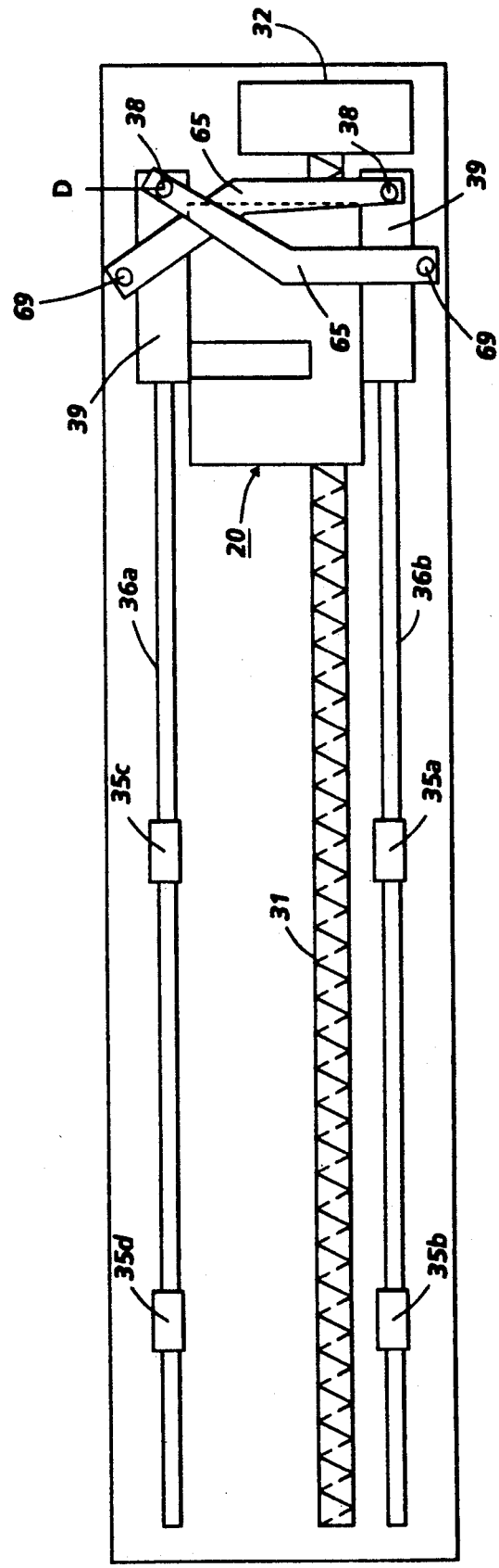

The movement of the scan carriage 20 supporting image reading head or assembly 21, 23, 26 and printing head 25 is further illustrated with reference to FIG. 5. Arrows 33a and 33b illustrate a forward and a reverse scan of the carriage 20 across a document and copy sheet. The arrows 68 illustrate that a number of pixels, perpendicular to the direction of movement of scan carriage 22, are both read by the reading head and printed by the printing head as the carriage scans the document and copy sheet. In a typical embodiment, 384 pixels at 400 per inch are read and printed perpendicular to the movement of the carriage as it scans. In this example, arrow 68 represents a band of information 0.0025 inch long and 0.96 wide which is read and printed. This enables scanning a band of information about 0.96 inches wide. The movement of the carriage can be continuous or in discrete steps, but in a preferred embodiment, the 384 pixels are read and printed in increments that are one pixel apart as shown. In one embodiment, each time the scan carriage moves a distance of one pixel width across the sheet, the electronic image of 384 pixels down the sheet are moved into a shift register and then amplified and shifted in reverse order into the print head to heat the 384 heater elements 53 and thereby create a print of the 384 pixels previously read. This sequence is repeated each time the scan carriage has moved a distance of one pixel width. It should be noted that the scanning could also be done with 384 parallel channels, each channel reading and writing a single line of pixels as the carriage sweeps across the page. While it is preferred that the read/write operation be substantially simultaneous it should also be noted a digital buffer or register could be incorporated to initially store the scanned or read signals for later printing after a predetermined or arbitrary time period. It should also be understood that the combined scanner illustrated has multi-mode capability and could be operated independently as a printer modulated by any suitable device providing digital information, operated independently as a scanner to convert source documents to a digital representation, or operated as a facsimile device using the reading and printing elements when combined with a suitable modem, or as a copier by combining the scanning and printing operations. As a printer only the reading head need not be included and as a scanner only the printing head need not be included.

Figure 2:
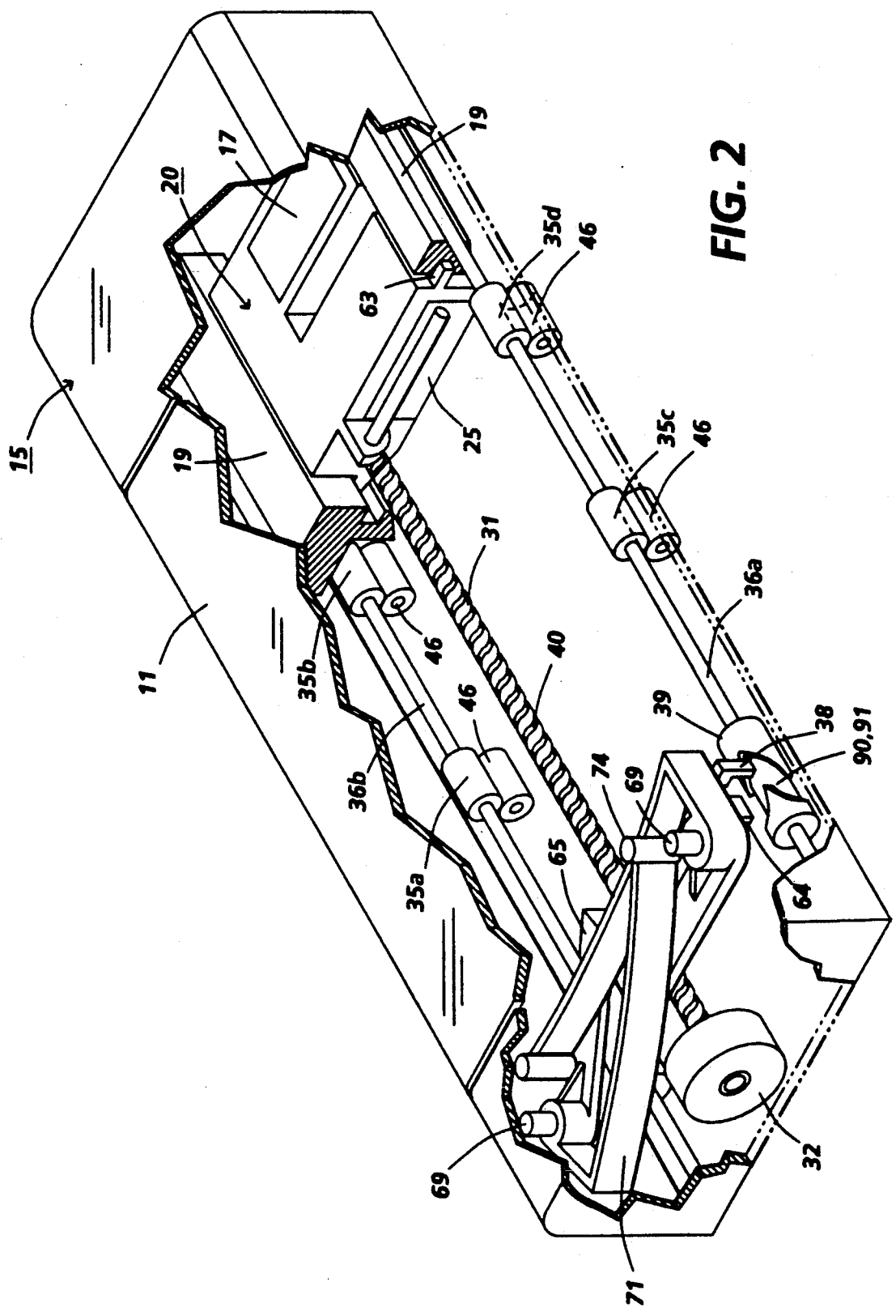
FIG. 2 is an isometric view of the compact scanner according to the present invention with the top cover removed.

With further reference to FIG. 2, and additional reference to FIGS. 3-8 the single actuator copier will be described in further detail. The scan carriage 20 is driven by a lead screw 31 which may be attached directly to a stepper motor 32 as illustrated in FIG. 2 or alternatively driven through a gear train. As the motor rotates the lead screw, the grooves 40 in the lead screw engage threads (not shown) on the interior of the scan carriage to translate the read/write carriage along the lead screw. The pitch on the lead screw is selected, such that, each pulse or every second, third or fourth pulse, of the stepper motor corresponds to one pixel width or 1/400th inch of carriage motion. This enables the same clock pulse generator used to drive the stepper motor to be used to trigger the read/write systems on the scanning carriage. Alternatively, a D.C. motor may be used to actuate the lead screw and together with an encoder wheel generate a signal which is used to trigger the read and/or write functions.

Following a scanning run in either direction across the length of the frame assembly the document and copy sheet are each indexed through the scanner in opposite directions a distance equal to the width of the band of information on the document scanned by the reading head which is the same as the width of the band of information printed on the copy sheet by the printing head. This width can be any width from a minimum of a single pixel line to a maximum of the width of the entire document. In practical terms, however, in order to keep the cost of the read and write components low the width of the band is of the order of a fraction of an inch to several inches wide. The method for achieving this is illustrated with further reference to FIG. 2 and FIG. 3 wherein an indexing means is provided comprising rotatable drive rolls 35a, b, c and d mounted on drive roll shafts 36a and 36b forming feeding nips for a document with document feed idler rolls 42 contained within the top cover 11 of the scanner. The term synchronously driven is intended to define only that the shafts 36 are synchronized to each other. The drive rolls 35a, b, c and d also form feeding nips for a copy sheet with the copy sheet idler rolls 46 in the copy sheet transport path.

With the read/write carriage in the home position, the stepper motor 32 rotates the lead screw 31, which translates the carriage 20 in an imaging sweep across the copier frame 15. At the completion of the imaging sweep a tab 63 on the carriage contacts a stop 64 on cam actuator arm 65 which is pivotally mounted about fixed pivot 69 and moves it in the scanning direction whereby cam drive pin 38 turns the barrel cam 39 which is fixedly mounted to shaft 36. Attached to cam actuator arm 65 at its fixed end is a spring, which may, for example, be an integrally molded plastic leaf spring 71 which is in biased engagement at its other end with a fixed stop member 74 and is always urging the cam drive pin 38 to detent into the end of a slot on the barrel cam 39 in the home position.

In operation as the carriage moves in a first direction tab 63 engages stop 64 causing arm 65 to rotate about pivot 69. During this motion pin 38 engages a cam profiles 90 (See FIG. 7A) of barrel cams 39 on the end of the drive roll shafts 36a and b and rotates the barrel cams and shafts 36a and 36b a portion of a complete rotation. During this motion energy is stored in leaf spring 71 as the carriage motion causes arm 65 to rotate which causes spring 71 to flex. The direction of rotation of the motor is reversed and the translating read/write carriage is driven in a second direction. The energy stored in spring 71 causes the arm 65 to rotate in the opposite direction following the movement of the carriage. During this motion which causes the pin 38 to engage a second cam profile 91 on the barrel cam thus, causing a second portion of rotation in the same direction as the first rotation. This may be more completely understood with reference to FIGS. 6A, 6B, 6C and 6D, which illustrate the position of the scanning carriage at several positions, and FIGS. 7A and 7B which illustrate the cam unwrapped to a flat profile. Thus, when the carriage moves in the first direction for forward indexing, the cam drive pin 38 advances from point A to point B, during which the cam does not rotate. As, the motion of the scanning carriage causes the pin 38 to continue from point B to point C the cam profile 90 is engaged and the cam rotates a distance M. When motion of the scanning carriage is reversed the pin moves from point C to point E (see FIG. 7A) and the cam does not rotate during this motion. As the scanning carriage continues in the opposite direction enabling pin 38 to move from point E to point A once again, the return cam profile 91 is engaged by pin 38 and the cam rotates a distance N. At point A, the cam has rotated one complete revolution, the cam actuator arm is spring loaded by the preload energy stored in spring 71 to detent the pin at A to insure that the drive roll will hold position during the subsequent scanning cycle and resist shaft 36 rotation due to perturbing forces which could cause pixel placement errors. When the carriage reaches a position which corresponds to the cam pin at A the second time, the carriage normally continues to translate in the reverse direction across the imaging area until it reaches the other side of the document and copy paper. For bi-directional reading and writing imaging would be accomplished during this return sweep. For uni-directional reading and writing imaging is done only in the forward direction. Unidirectional imaging limits the pixel placement errors due to any backlash in the system. For 11 inch long paper 12 imaging sweeps are required for a printhead 384 pixels wide. After the last imaging sweep of the read/write carriage, the next copying cycle can begin immediately by loading the next document and copy paper into the system.

Figure 7A:
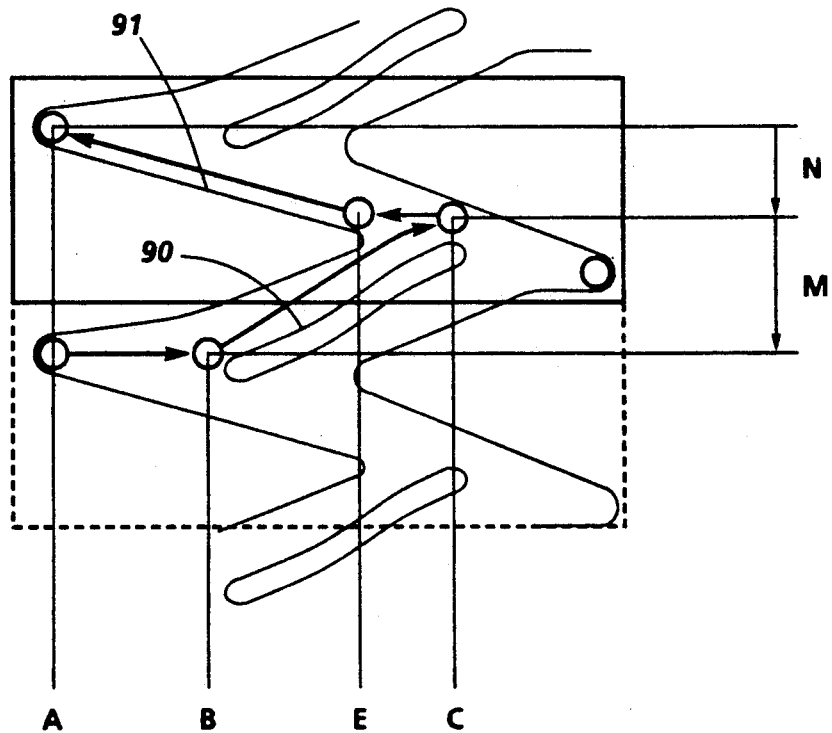
FIGS. 7A and 7B show the cam unwrapped to a flat profile.
Figure 7B:
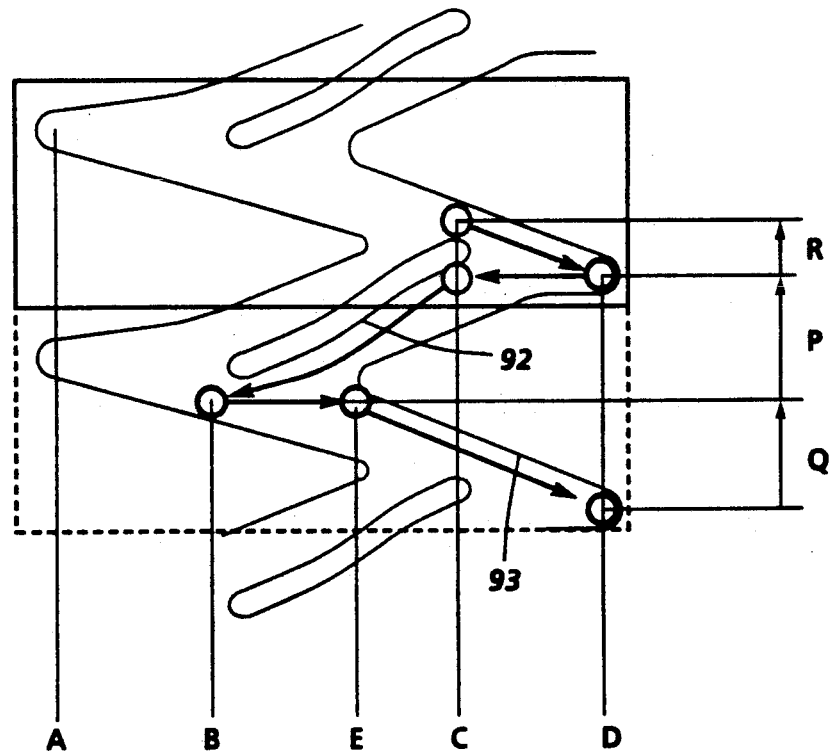

The scanner, according to the present invention, has application with the platen accessory described in U.S. application Ser. No. 07/547,275 as described above and for purposes of returning the scanner to the home position automatically can be provided with a third and fourth cam profile molded into the barrel cam as illustrated in FIG. 7B. Accordingly, after the last imaging sweep the scanner will be located at the other end of the platen from its start position. Rather than stopping the pin 38 at position C and reversing to position A as was done for forward indexing, the translating carriage continues to move the pin in the first direction past position C until it reaches position D. At that time, the carriage alternately reverses direction to move the pin 38 between positions D and B for a total of 12 cycles. This motion causes the pin to engage two additional cam profiles 92, 93 on the barrel cam which rotate the drive shaft in the opposite direction to that of the forward index and which automatically moves the copier back to its home position. After the last half cycle from position D to B, the carriage and pin continue in a second direction and thus, moving the pin to its detent position at A. Having moved the copier back to its home position, the read/write carriage continues in a second direction across the imaging area to the carriage home position.

Figure 3:
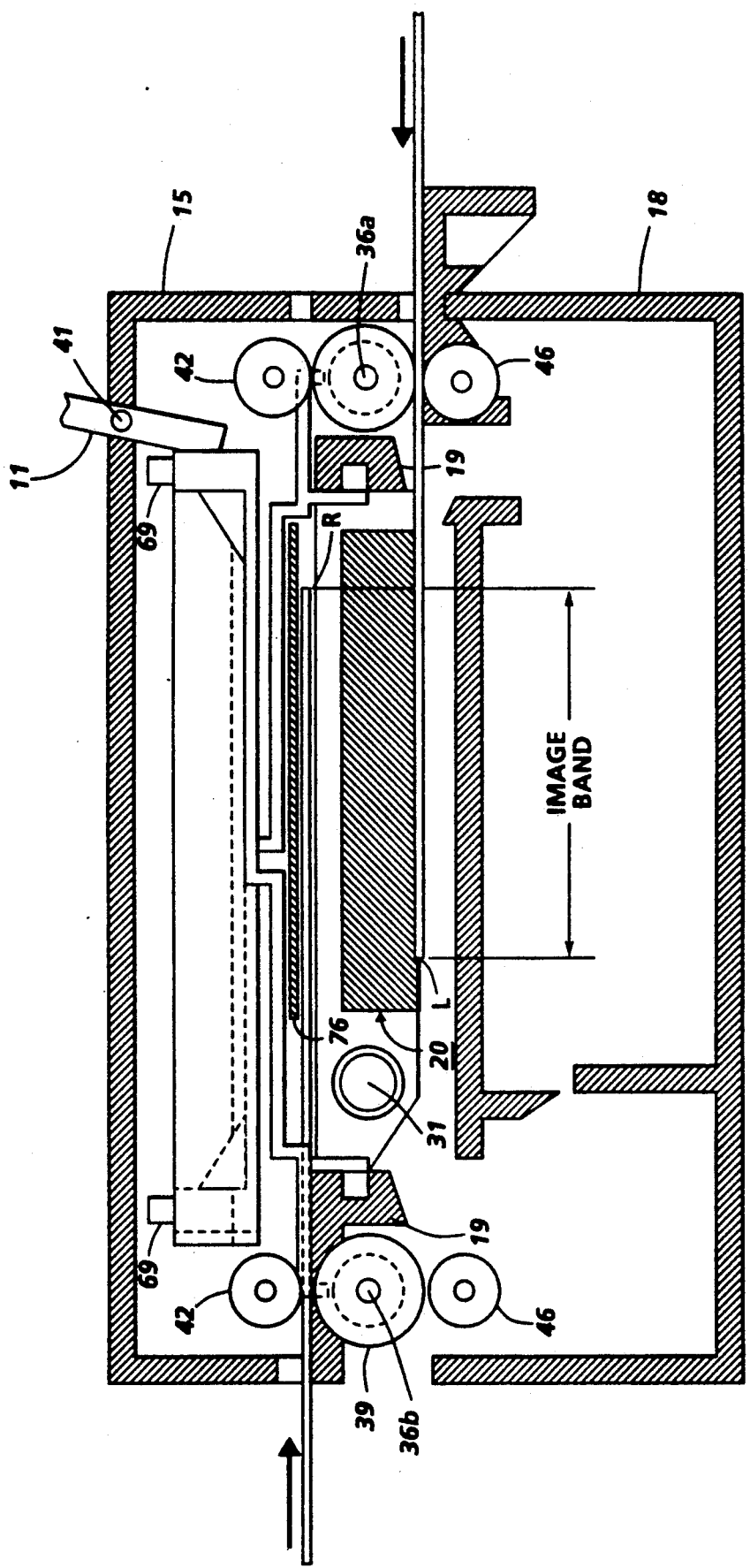
FIG. 3 is a schematic cross sectional view of the compact scanner according to the present invention.

With additional reference to FIG. 3, the top cover 11 is pivotally mounted to the frame assembly 15 and in particular the base unit 18 and pivots about points 41. When the top cover is pivoted to the open position the document feed idler roll 42 are disengaged from the drive rolls a registration edge is inserted into the plane of the document transport path enabling the placement of a document to be copied in the scanner with its lead edge registered and inhibiting transport of the document through the document transport path. In a preferred embodiment the circumference of the drive rolls is equal to the width of the band of information across the document scanned by the scanning carriage to eliminate run out and shaft straightness tolerance defects which otherwise might cause some misregistration between scan widths.

As illustrated in FIG. 3 the second pair of indexing rolls is located on the opposite side of the lead screw from the first pair of indexing rolls. This second indexing roll pair is the same as the first, namely they are mounted on a shaft which has a barrel cam on one end which is actuated in the same manner as the first indexing roll pair by an actuator to provide synchronization between the first and second pair of index rolls. With the second pair of indexing rolls deletions on the top and bottom of an image read and/or an image printed are eliminated. With only a single indexing roll system both the document and copy sheet must be loaded into the single nip which means that the distance from the nip to the image area is a deletion.

Figure 8:
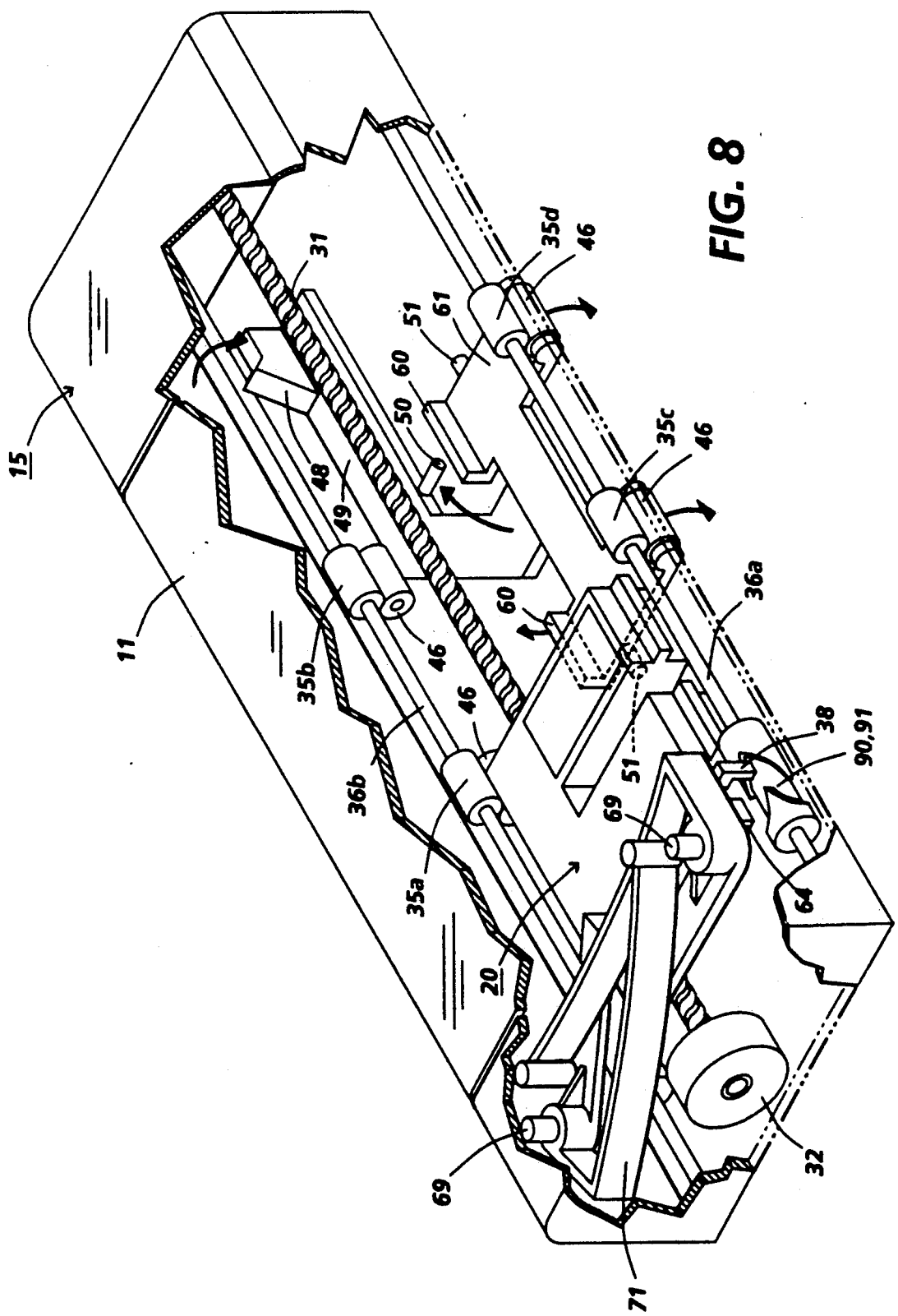
FIG. 8 is a isometric view of the copy sheet registration gate and idler roll arrangement.

Attention is directed to FIG. 8 illustrating the copy sheet registration, mechanism wherein the read/write carriage 20 engages a ramp 48 on a toggling link 49 just before it reaches its home position. This engagement and further motion of the read/write carriage causes the toggling link 49 to rotate about a pivot 50 and the other end of the toggling link 49 lifts the registration gates 60 into the paper path as shown in the FIG. 8. The registration gates 60 are mounted on a pivoting frame 61, which has the copy paper idler rolls 46 mounted on the opposite side of the pivot 51 for this frame. Accordingly, when the registration gates 60 are lifted the copy paper idler rolls 46 are simultaneously disengaged from the drive rolls. This motion opens the nips and allows the operator to insert a piece of copy paper for the next copying job. When the read/write carriage moves in a first direction away from the home position, this motion also allows toggle link 49 to return to its initial position which drops the registration gates out of the paper path and engages the idler rolls to the drive rolls, thus, capturing and holding the copy paper in position during the imaging sweep, and providing a drive force on the copy paper during the index cycle at the end of the imaging sweep.

When the top cover is opened the idler rolls in the document path which are mounted in the top cover are moved out of position enabling placement of the document against the front registration edge which is part of the top cover assembly. Following insertion of the copy sheet the top cover is closed thereby re-engaging the document idler rolls with the drive roll. In addition, two sensors (not illustrated) detect that both the document and the copy paper have been loaded, and accordingly, the logic initiates the copying sequence. The scan carriage containing the reading and writing heads moves from the home position, dropping the registration gates out of the paper path and engaging the copy paper idler rolls to the drive rolls, scans across the document and copy sheet while both remain stationary. The document is positioned so that its lead edge coincides with the right side pixel of the read head, and the copy paper is positioned so that its lead edge coincides with the left side pixel of the print head. This enables the formation of a right reading image on the copy sheet. A line of information on the document read on the right extreme of the image read head fires the print head on the extreme left of the printing array during the scan of the carriage 20. This may be illustrated with reference to FIG. 3. The pixel data received by the input chip at the extreme right of the chip (R); as the carriage 20 moves in the direction into and out of the paper is transmitted and amplified to modulate the print head to fire the print head at the extreme left (L) of the print head. This scheme enables the printing of right reading copies with essentially simultaneous reading and writing without information storage. As the carriage scans across both the document and the copy paper, the 0.96 inches band of information being read off the document is immediately printed onto the copy paper. When the first imaging scan is complete the carriage motion continues in the same direction engaging the stops 64 on the cam actuator arm 65 causing the arm to move which rotates cam 39 and shafts 36a and b causing both both the document and copy paper to be indexed in a direction transverse to the scanning direction the width of the band of information previously scanned. This indexing is accomplished by driving the drive rolls which engage the document at the 12:00 position with the document feed idler rolls forming a feeding nip therebetween, and the copy paper at the 6:00 position with the copy sheet feed idler roll forming a feeding nip therebetween. The clockwise motion of the drive rolls of one revolution causes a document to be indexed 0.96 inches to the right and the copy paper to be indexed 0.96 inches to the left. In this way the second band of information from the document is moved into a position over a scan carriage and a second portion of the copy paper is moved to a position under the print head. The scan carriage reverses and returns to a position near the home position then reverses direction again to scan across the document and copy paper in the reverse direction from the first scan again reading the document and immediately printing the copy. This sequence is repeated until the entire document is read and the entire copy is printed after which time the print head returns to the home position and is parked.

Figure 9:
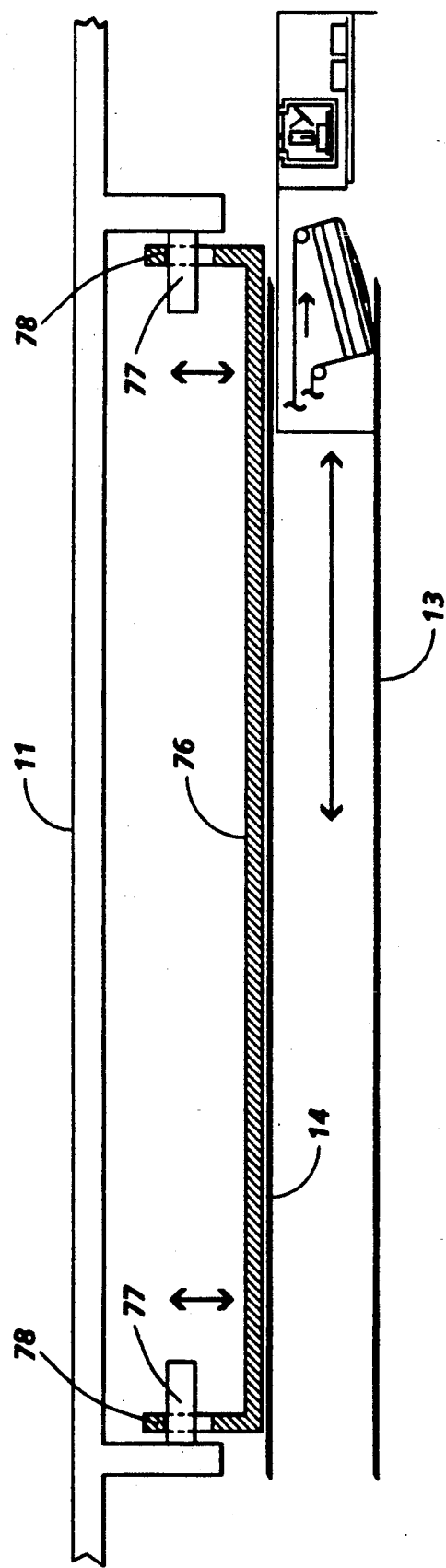
FIG. 9 is a sectional view of showing the floating document backstop supported in the top cover and the scanning path of the scanning carriage.

With continued reference to FIG. 3 and additional reference to FIG. 9 the floating document backstop 76 will be described in greater detail. The floating document backstop 76 is mounted to the top cover 11 by means of fixed location pins 77, one or more on each end of the cover mount, the pins protruding within the slot 78 on each end of the floating backstop enabling the backstop to be vertically, movably, engaged or floating relative to the top cover 11 and reading head 17. The floating backstop extends across the scanning path and is slightly longer than the length of the entire sweep and slightly greater than the width of the scanned image. To operate the scanner, the operator pivots the top cover to the open position and inserts a document to register its lead edge. When the cover is closed the document is constrained between the floating document backstop and the rest of the optical imaging assembly. When the read/write carriage scans across the document the floating backstop presses the document to the platen in the optical frame on the read/write carriage only at the portion being imaged to constrain the document into the plane of best focus. After the imaging sweep is completed the read/write carriage moves out of direct contact with the document which then can be indexed without experiencing the drag load created by the floating backstop trapping the document against the platen. While the backstop "floats" in the slots in the top cover it is preferably rigid to inhibit damaging the document by wrinkling or creasing and has a white reflective surface to function like a regular platen cover reflecting light from the illuminator. The floating backstop enables the lens in the contact image sensor to be designed with a relatively narrow depth of focus.

Accordingly, by the present invention, an optical assembly with the minimum components all mounted onto a carriage fixed frame has been provided which does not require final adjustments. The rigid floating backstop constrains the document into the plane of best focus without exerting undue drag on the drive system and reduces concern for mounting tolerances.

All the patents and other references together with the cross-referenced copending applications are hereby and specifically totally incorporated in their entirety into this specification.

While the invention has been described with reference to specific embodiments thereof it will be apparent to those skilled in the art that many alternatives, modifications and variations may be made. For example while the invention has been illustrated with respect to having an indexing mechanism for the document and copy sheets on only one side of the scanner it will be appreciated that a similar indexing mechanism may be provided on the opposite side of the scanner. Accordingly, it is intended to embrace all such alternatives and modifications as may fall in the spirit of the appended claims.

I claim:

1. A scanner comprising a frame assembly for supporting a movable document reading head for scanning movement in a scanning path in a first direction, means to transport a document through said scanner, means to move said reading head across said document to read at least a portion of said document, said reading head comprising an optical imaging assembly including a frame supporting an imaging platen, said scanner including a vertically movable floating document backstop opposite and on top of said imaging platen and extending across said scanning path to precisely locate and constrain a portion of a document being imaged into a plane of best focus on said platen during an imaging operation.

2. The scanner of claim 1 wherein said imaging assembly includes an image illuminator, a lens and an input sensor having at least one photosite.

3. The scanner of claim 1 wherein said floating document backstop is rigid.

4. The scanner of claim 3 wherein said floating document backstop has a reflective white surface.

5. The scanner of claim 1 including a top cover for said frame assembly, said floating document backstop being movably supported in said cover.

6. The scanner of claim 5 wherein said floating document backstop has mounting slots at each end which are in engagement with and vertically movably supported by mounting pins in said top cover.

7. The scanner of claim 1 further including a movable printing head, means to transport a copy sheet through the scanner in a copy sheet transport path means to move said printing head across said copy sheet to print an image on at least a portion of said copy sheet.

8. The scanner of claim 1 wherein the reading head and writing head are comounted on the same carriage.

9. The scanner of claim 7 wherein the reading head produces a digital image of at least a portion of a document and is electrically connected to said printing head for printing a digital image corresponding to that portion of a document read by said reading head on said copy sheet.

10. The scanner of claim 7 wherein said reading and printing occur essentially simultaneously without information storage.

11. The scanner of claim 7 wherein a right side pixel of the read head coincides with a lead edge of a portion of a document to be copied and a left side pixel of the print head coincides with a lead edge of the print of said portion on a copy sheet to form a right reading image on the copy sheet.

12. The scanner of claim 7 wherein said scanning carriage is movably mounted between a plane of said document transport path and a plane of said copy sheet transport path.

13. The scanner of claim 7 wherein said means to transport a document and copy sheet include means to index a document through a document path in a direction transverse to said first direction and to index a copy sheet through a copy sheet path in an opposite transverse direction of indexing said document.

14. The scanner of claim 13 wherein said document transport path is above said copy sheet transport path and said reading head and printing head are co-mounted on said scanning carriage for essentially simultaneously reading a document face side down in said document transport path and printing a digital image face side up on a copy sheet.

15. The scanner of claim 7 wherein said indexing means simultaneously indexes a document in said document transport path and a copy sheet in said copy sheet transport path.

16. The scanner of claim 15 wherein when said carriage moves in said first direction the reading head scans a band of information across the document and the printing head essentially simultaneously prints the same band of information across a copy sheet and upon completion of said scanning movement said indexing means indexes the document and copy sheet through their respective paths a distance equal to a width of said band of information before said carriage scans another band of information across the document.

17. The scanner of claim 16 wherein drive rolls have a circumference equal to the width of the band of information.

* * * * *